United States Patent [19]
Fortier

[11] Patent Number: 5,588,662
[45] Date of Patent: Dec. 31, 1996

[54] ADJUSTABLE BICYCLE REAR AXLE SUPPORT ASSEMBLY

[76] Inventor: Robert L. Fortier, 502 W. Blum St., Alvin, Tex. 77511

[21] Appl. No.: 396,572

[22] Filed: Mar. 1, 1995

[51] Int. Cl.$^6$ .......................... B62K 19/24; B62K 25/02
[52] U.S. Cl. ........................ 280/288; 280/278; 280/287
[58] Field of Search ............................. 280/274, 278, 280/281.1, 284, 287, 288

[56] References Cited

U.S. PATENT DOCUMENTS

| | | | |
|---|---|---|---|
| 564,797 | 7/1896 | Lovelace | 280/288 |
| 702,992 | 6/1902 | Pecor | 280/288 X |
| 3,448,997 | 6/1969 | Kosugi | 280/287 X |
| 3,990,717 | 11/1976 | Best | 280/278 |
| 4,577,879 | 3/1986 | Vereyken | 280/287 X |
| 4,582,335 | 4/1986 | Paioli et al. | 280/287 X |
| 5,205,573 | 4/1993 | Mhedhbi | 280/287 |
| 5,460,396 | 10/1995 | Sutter et al. | 280/284 |

FOREIGN PATENT DOCUMENTS

| | | | |
|---|---|---|---|
| 2834384 | 2/1979 | Germany | 280/287 X |
| 503780 | 3/1976 | Russian Federation | 280/287 |

Primary Examiner—Brian L. Johnson
Assistant Examiner—F. Zeender

[57] ABSTRACT

An assembly for adjustably supporting a rear wheel of a bicycle at a desired orientation relative to a bicycle frame. The inventive device includes a bicycle frame having a rear vertical member. A rear axle support member is pivotally mounted to a lower portion of the rear vertical member and projects outwardly therefrom to support a rear axle of a rear wheel. An adjustment assembly extends between the rear axle support member and an upper portion of the rear vertical member to adjustably support the rear axle support member at a fixed angle relative to the rear vertical member of the bicycle frame.

9 Claims, 4 Drawing Sheets

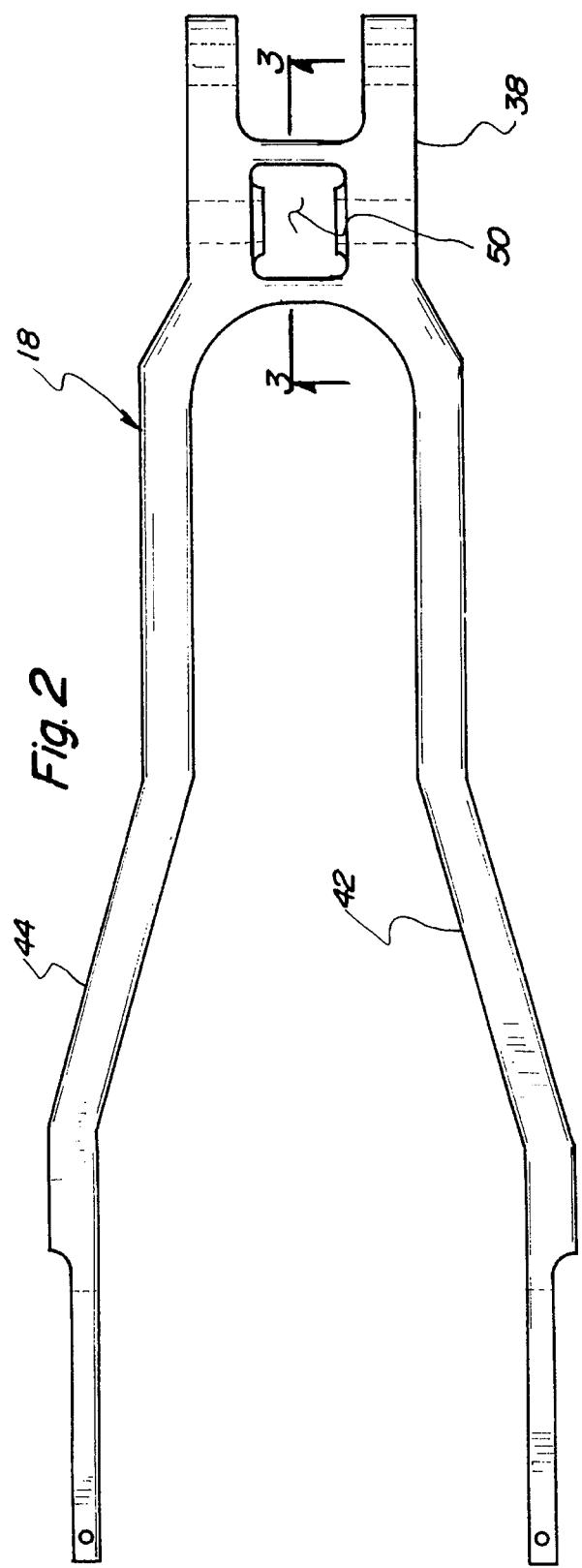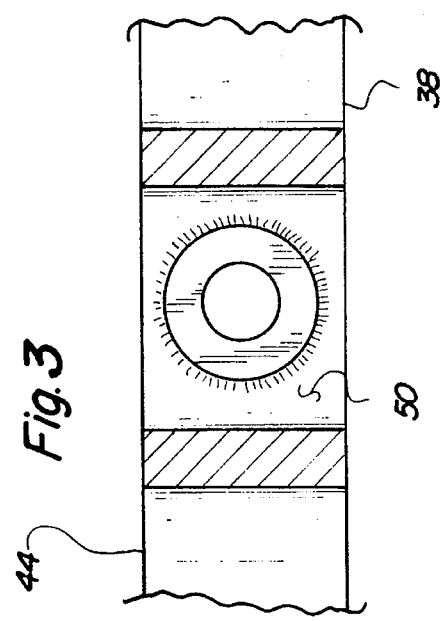

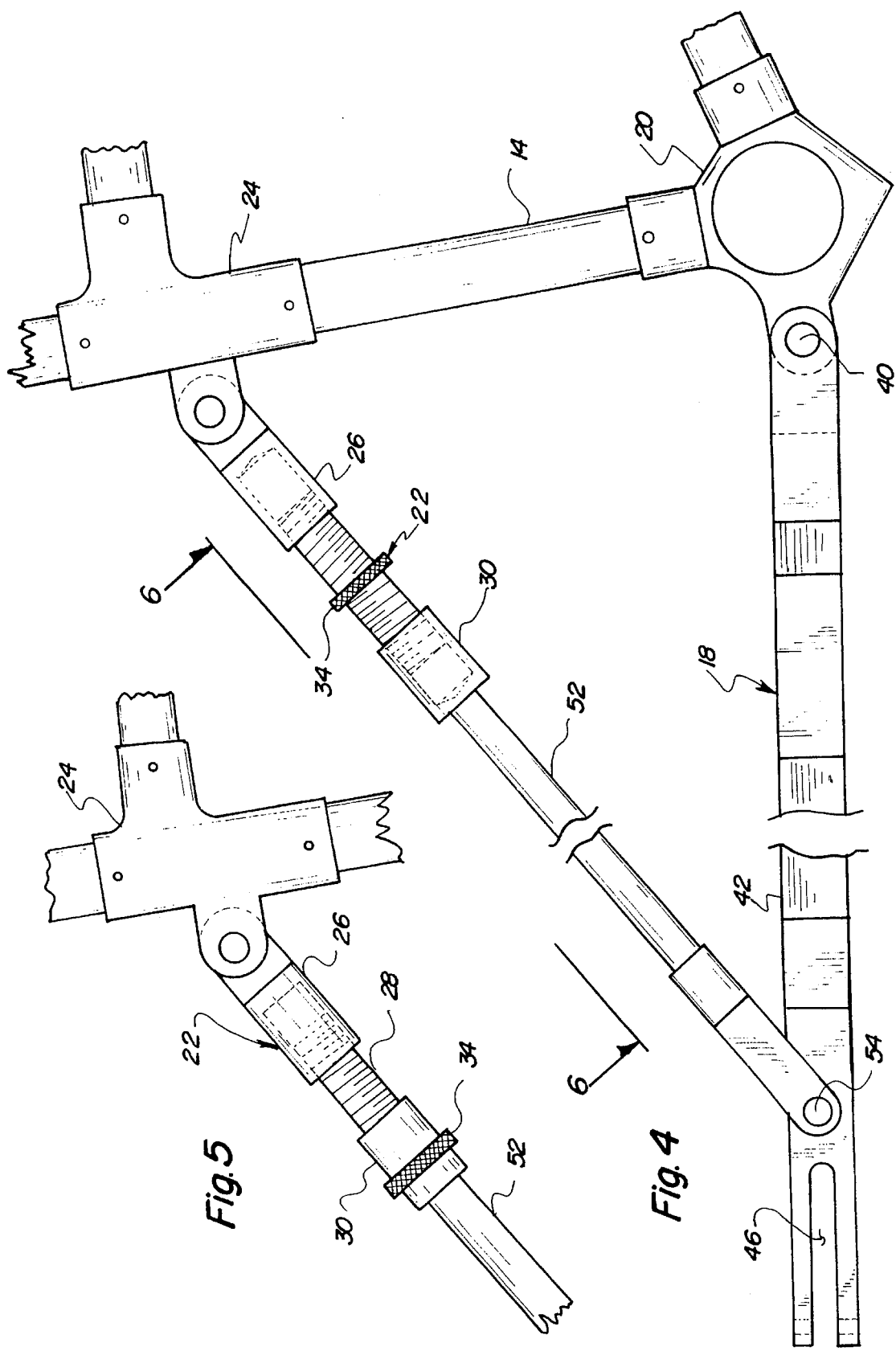

ADJUSTABLE BICYCLE REAR AXLE SUPPORT ASSEMBLY

BACKGROUND OF THE INVENTION

1. Field of the Invention

The present invention relates to bicycle frame structures and more particularly pertains to an adjustable bicycle rear axle support assembly for adjustably supporting a rear wheel at a desired orientation relative to a bicycle frame.

2. Description of the Prior Art

The use of bicycle frame structures is known in the prior art. More specifically, bicycle frame structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art bicycle frame structures include U.S. Pat. Nos. 3,791,672; 3,814,462; 4,895,386; 5,222,751; 5,224,726; and 5,337,609.

While these devices fulfill their respective, particular objectives and requirements, the aforementioned patents do not disclose an adjustable bicycle rear axle support assembly for adjustably supporting a rear wheel at a desired orientation relative to a bicycle frame which includes a bicycle frame having a rear vertical member, a rear axle support member pivotally mounted to a lower portion of the rear vertical member and projecting outwardly therefrom to support a rear axle of a rear wheel, and an adjustment assembly extending between the rear axle support member and an upper portion of the rear vertical member to adjustably support the rear axle support member at a fixed angle relative to the rear vertical member of the bicycle frame.

In these respects, the adjustable bicycle rear axle support assembly according to the present invention substantially departs from the conventional concepts and designs of the prior art, and in so doing provides an apparatus primarily developed for the purpose of adjustably supporting a rear wheel at a desired orientation relative to a bicycle frame.

SUMMARY OF THE INVENTION

In view of the foregoing disadvantages inherent in the known types of bicycle frame structures now present in the prior art, the present invention provides a new adjustable bicycle rear axle support assembly construction wherein the same can be utilized for adjustably supporting a rear wheel relative to a bicycle frame. As such, the general purpose of the present invention, which will be described subsequently in greater detail, is to provide a new adjustable bicycle rear axle support assembly apparatus and method which has many of the advantages of the bicycle frame structures mentioned heretofore and many novel features that result in an adjustable bicycle rear axle support assembly which is not anticipated, rendered obvious, suggested, or even implied by any of the prior art bicycle frame structures, either alone or in any combination thereof.

To attain this, the present invention generally comprises an assembly for adjustably supporting a rear wheel at a desired orientation relative to a bicycle frame. The inventive device includes a bicycle frame having a rear vertical member. A rear axle support member is pivotally mounted to a lower portion of the rear vertical member and projects outwardly therefrom to support a rear axle of a rear wheel. An adjustment assembly extends between the rear axle support member and an upper portion of the rear vertical member to adjustably support the rear axle support member at a fixed angle relative to the rear vertical member of the bicycle frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new adjustable bicycle rear axle support assembly apparatus and method which has many of the advantages of the bicycle frame structures mentioned heretofore and many novel features that result in an adjustable bicycle rear axle support assembly which is not anticipated, rendered obvious, suggested, or even implied by any of the prior art bicycle frame structures, either alone or in any combination thereof.

It is another object of the present invention to provide a new adjustable bicycle rear axle support assembly which may be easily and efficiently manufactured and marketed.

It is a further object of the present invention to provide a new adjustable bicycle rear axle support assembly which is of a durable and reliable construction.

An even further object of the present invention is to provide a new adjustable bicycle rear axle support assembly which is susceptible of a low cost of manufacture with regard to both materials and labor, and which accordingly is then susceptible of low prices of sale to the consuming public, thereby making such adjustable bicycle rear axle support assemblies economically available to the buying public, Still yet another object of the present invention is to provide a new adjustable bicycle rear axle support assembly which provides in the apparatuses and methods of the prior art some of the advantages thereof, while simultaneously overcoming some of the disadvantages normally associated therewith.

Still another object of the present invention is to provide a new adjustable bicycle rear axle support assembly for adjustably supporting a rear wheel at a desired orientation relative to a bicycle frame.

Yet another object of the present invention is to provide a new adjustable bicycle rear axle support assembly which includes a bicycle frame having a rear vertical member, a rear axle support member pivotally mounted to a lower portion of the rear vertical member and projecting outwardly therefrom to support a rear axle of a rear wheel, and an adjustment assembly extending between the rear axle support member and an upper portion of the rear vertical member to adjustably support the rear axle support member at a fixed angle relative to the rear vertical member of the bicycle frame.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a top plan view of a portion of the present invention as viewed from line 2—2 of FIG. 1.

FIG. 3 is a cross sectional view taken along line 3—3 of FIG. 2.

FIG. 4 is a side elevation view of an alternative form of the present invention.

FIG. 5 is a side elevation view of an alternative form of an adjustment means of the present invention.

DESCRIPTION OF THE PREFERRED EMBODIMENT

Figure 1:
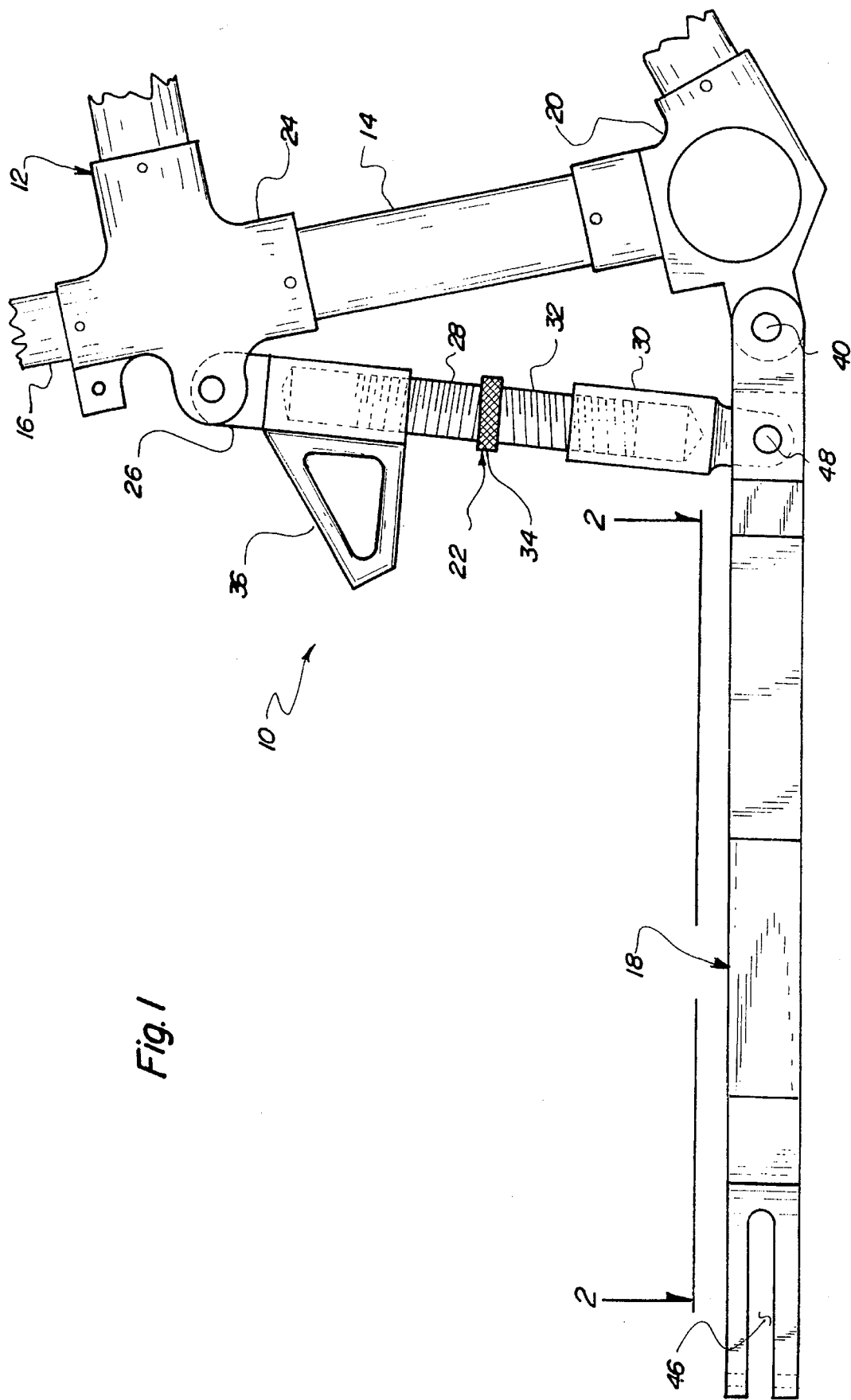
FIG. 1 is a side elevation view of an adjustable bicycle rear axle support assembly according to the present invention.
Figure 6:
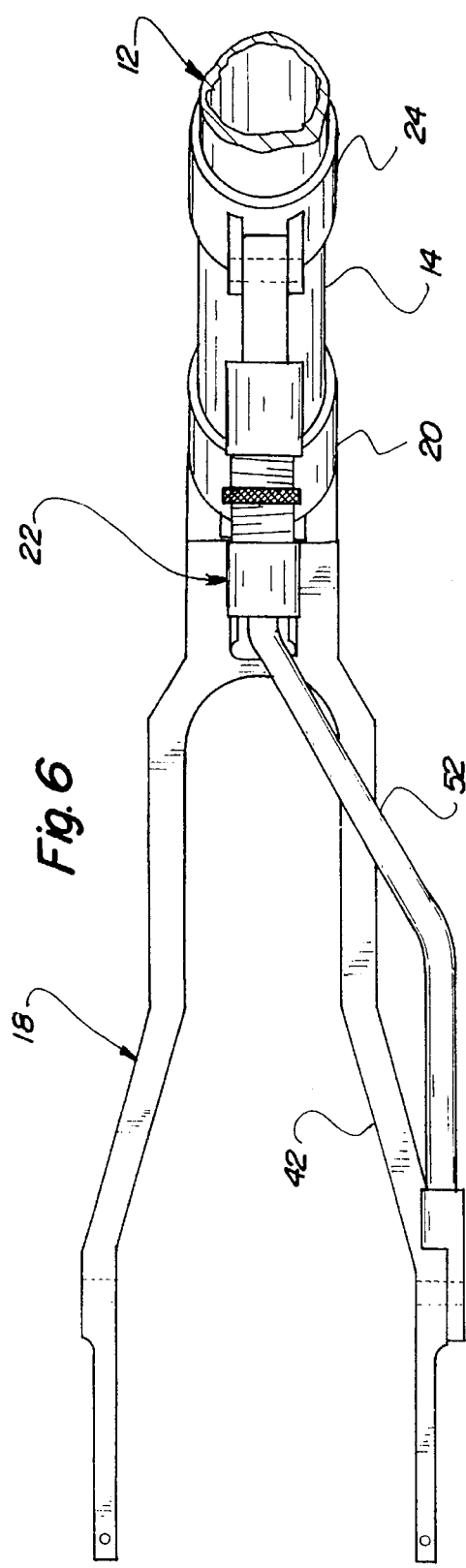
FIG. 6 is a top plan view of the invention as viewed from line 6—6 of FIG. 4.

With reference now to the drawings, and in particular to FIGS. 1–7 thereof, a new adjustable bicycle rear axle support assembly embodying the principles and concepts of the present invention and generally designated by the reference numeral 10 will be described.

More specifically, it will be noted that the adjustable bicycle rear axle support assembly 10 comprises a bicycle frame 12 having a rear vertical member 14 which typically receives and supports a seat post 16 and associated unillustrated seat upon which an individual can reside. A rear axle support member 18 is pivotally mounted to a lower portion 20 of the rear vertical member 14 and extends rearwardly of a unillustrated majority of the bicycle frame 12. The rear axle support member 18 is operable to rotatably mount an unillustrated rear wheel relative to the bicycle frame 12. An adjustment means 22 extends between the rear axle support member 18 and an upper portion 24 of the rear vertical member 14 for adjustably positioning the rear axle support member into a fixed angular orientation relative to the rear vertical member 14. By this structure, an orientation of a rear wheel of a bicycle can be adjustably positioned relative to the bicycle frame 12.

As best illustrated in FIG. 1, it can be shown that the adjustment means 22 according to the present invention 10 preferably comprises a first receiver 26 pivotally mounted to the upper portion 24 of the rear vertical member 14. The first receiver 26 is shaped so as to define a threaded bore directed thereinto, with a first threaded projection 28 being threadably received within the threaded bore of the first receiver 26. A second receiver 30 is pivotally mounted to the rear axle support member 18 and includes an unlabeled threaded bore directed thereinto, with a second threaded projection 32 being threadably positioned within the threaded bore of the second receiver 30. The first threaded projection 28 is coupled to the second threaded projection 32 by a griping member 34 interposed therebetween which facilitates manual rotation of the threaded projections 28 and 32. The threaded projections 28 and 32 and the gripping member 34 can be integrally formed from a single piece of material if desired. Preferably, the threaded projections 28 and 32 are shaped so as to define oppositely oriented threads such that a rotation of the gripping member 34 in a first direction will advance the threaded projections 28 and 32 into the respective threaded bores of the first and second receivers 26 and 30, with a rotation of the gripping member 34 in a second direction advancing the threaded projections from the respective threaded bores. By this structure, a distance between the first receiver 26 and the second receiver 30 can be selectively adjusted so as to position the rear axle support member 18 at a desired angular orientation relative to the rear vertical member 14 of the bicycle frame 12. If desired, a brake caliper bracket 36 can be secured to the first receiver 26 so as to support a conventionally known bicycle brake caliper relative to an unillustrated wheel when the same is coupled to the rear axle support member 18.

Referring now to FIGS. 2 and 3, it can be shown that the rear axle support member 18 of the present invention 10 preferably comprises a support member plate 38 pivotally mounted to the lower portion 20 of the bicycle frame 12 by a support member pivot axle 40 directed through the support member plate 38 and the lower portion 20. Preferably, the lower portion 20 of the bicycle frame 12 comprises a crank housing through which a conventionally know bicycle pedal crank is rotatably mounted. A first lateral rear axle support arm 42 projects from the support member plate 38 and is configured for positioning about a first lateral area of an unillustrated bicycle rear wheel. A second lateral rear axle support arm 44 projects from the support member plate 38 and is spaced from the first lateral rear axle support arm so as to extend along a second lateral side of the bicycle rear wheel. The lateral rear axle support arms 42 and 44 are each shaped so as to define an axle slot 46, as shown in FIG. 1, through which a rear axle of a rear wheel can be positioned so as to couple the rear wheel to the rear axle support member 18.

As shown in FIG. 1, the second receiver 30 of the adjustment means 22 is pivotally mounted to the support member plate 38 by an adjustment means pivot axle 48 directed through both a portion of the rear axle support member 18 and a portion of the second receiver 30. Preferably, the support member plate 38 of the rear axle support member 18 is shaped so as to define a mounting cavity 50 extending through the support member plate 38 within which a portion of the second receiver 30 is positioned. The adjustment means pivot axle 48 is thus extended through the mounting cavity 50 and a portion of the second receiver 30 so as to pivotally couple the second receiver and the associated adjustment means 22 relative to the rear axle support member 18.

Figure 7:
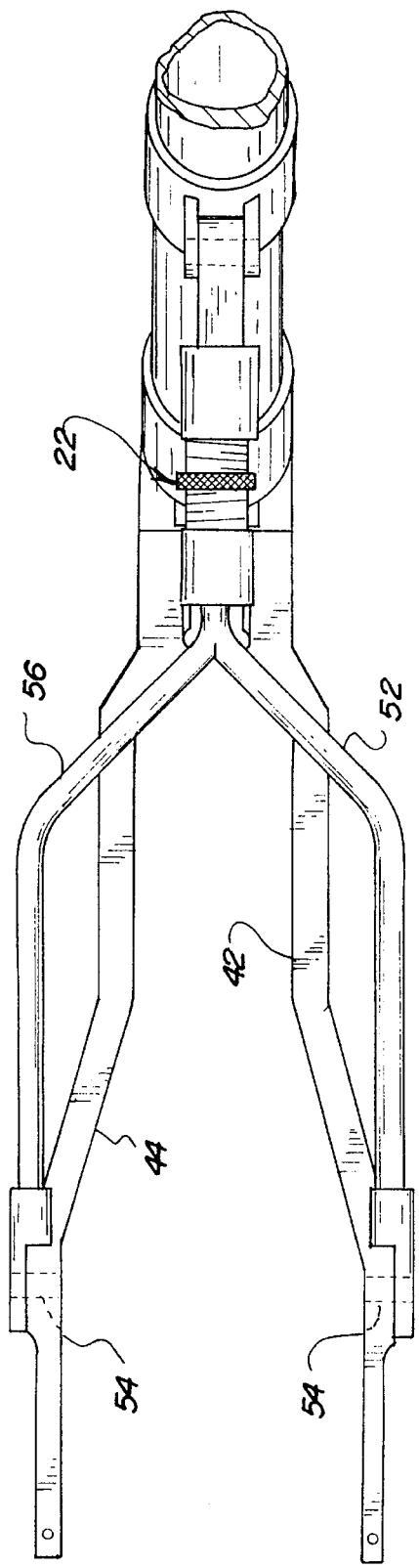
FIG. 7 is a top plan view of an alternative form of the present invention.

As shown in FIG. 1, the adjustment means 22 preferably extends from the upper portion 24 of the bicycle frame 12 and is pivotally coupled to the rear axle support member 18 proximal to the pivotal connection of the rear axle support member 18 and the lower portion 20 of the bicycle frame 12. Alternatively, and as shown in FIGS. 4 through 7, the adjustment means 22 may further comprise an offset extension arm 52 extending from the second receiver 30 which is pivotally mounted to the rear axle support arm 18 proximal to the axle slot 46 thereof by an extension arm pivot axle 54. As shown in FIG. 7, a second offset extension arm 56 can extend from the second receiver 30 for coupling to a second lateral rear axle support arm 44. By this structure, cantilever forces produced by the moment arm between the extension arm pivot axle or axles 54 and the axle slot 46 are substantially reduced relative to the moment arm between the adjustment means pivot axle 48 as illustrated in FIG. 1 and the axle slot 46 of the rear axle support member 18. Thus, the alternative form of the invention illustrated in FIGS. 4 through 7, permits the rear axle support member 18 to be constructed in a disparate manner relative to the rear axle support member 18 illustrated in FIG. 1. However, it should be noted that the rear axle support member 18 illustrated in FIG. 1, because of the cantilever moment arm between the adjustment means pivot axle 48 and the axle slot 46, permits slight resilient upward deformation of the rear axle support member 18 to provide resilient support of the bicycle frame 12 relative to the rear wheel of the bicycle. Although not specifically illustrated for the adjustment means 22, it is desirable for the same to include suitable locking fasteners or nuts which preclude unintentional rotation of the threaded projections 28 and 32 relative to the receivers 26 and 30 so as to lock a position of the adjustment means 22.

As shown in FIG. 5, an alternative form of the adjustment means 22 may comprise only a single threaded projection 28 which is threadably engaged to the first receiver 26, with the second receiver 30 being fixedly secured to the offset extension arm 52 or pivotally mounted to the rear axle support member 18 for the embodiment illustrated in FIG. 1. In this alternative form of the adjustment means 22, the first receiver 26 can be simply decoupled from the upper portion 24 of the bicycle frame 12, whereby a rotation of the first receiver relative to the first threaded projection 28 will effect axially positioning of the threaded projection relative to the first receiver so as to selectively adjust a length of the adjustment means 22. The first receiver 26 can then be simply recoupled to the upper portion 24 to secure the adjustment means 22 in the new position. Such coupling of the first receiver 26 to the upper portion 24 can be easily accomplished by an unlabeled pin extending through portions thereof.

In use, the adjustable bicycle rear axle support assembly 10 according to the present invention can be easily utilized or incorporated into a bicycle frame 12 so as to permit adjustable positioning of the rear wheel of the bicycle relative to the major portion of the bicycle frame 12. Such adjustable positioning of the rear wheel produces a change in the steering behavior of the associated bicycle which permits a rider of the bicycle to customize such steering behavior as desired.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous changes will readily occur to those skilled in the art, it is not desired to limit the invention to the exact construction and operation shown and described, and accordingly, all suitable modifications and equivalents may be resorted to, falling within the scope of the invention.

What is claimed and desired to be protected by Letters Patent of the United States is as follows:

1. An adjustable bicycle rear axle support assembly comprising:

a bicycle frame having a rear vertical member, with the rear vertical member including an upper portion, and a lower portion;

a rear axle support member pivotally mounted to the lower portion of the rear vertical member of the frame, the rear axle support member extending rearwardly of the bicycle frame and being adapted to rotatably mount a rear wheel relative to the bicycle frame, the rear axle support member comprises a support member plate pivotally mounted to the lower portion of the rear vertical member of the bicycle frame, a first lateral rear axle support arm projecting from the support member plate and adapted to be positioned about a first lateral area of a bicycle rear wheel;

an adjustment means extending between the rear axle support member and an upper portion of the rear vertical member for adjustably positioning the rear axle support member into a fixed angular orientation relative to the rear vertical member, the adjustment means comprises a first receiver pivotally mounted to the upper portion of the rear vertical member, a second receiver pivotally mounted to the rear axle support member, and threaded projection means threadably engaged to the first and second receivers for adjustably positioning the first receiver in a spaced relationship relative to the second receiver, the second receiver of the adjustment means is pivotally mounted to the support member plate, the support member plate being shaped so as to define a mounting cavity extending into the support member plate within which a portion of the second receiver is positioned.

2. The adjustable bicycle rear axle support assembly of claim 1, wherein the first receiver is shaped so as to define a first threaded bore directed thereinto, and the second receiver is shaped so as to define a second threaded bore directed thereinto; and further wherein the threaded projection means comprises a first threaded projection threadably received within the first threaded bore of the first receiver;

and a second threaded projection threadably received within the second threaded bore of the second receiver, the first threaded projection being coupled to the second threaded projection.

3. The adjustable bicycle rear axle support assembly of claim 2, wherein the threaded projections are shaped so as to define oppositely oriented threads such that a rotation of the threaded projections in a first direction will advance the threaded projections into the respective threaded bores of the first and second receivers, with a rotation of the threaded projections in a second direction advancing the threaded projections from the respective threaded bores.

4. The adjustable bicycle rear axle support assembly of claim 3, wherein the adjustment means further comprises a brake caliper bracket secured to the first receiver and adapted to support a bicycle brake caliper.

5. The adjustable bicycle rear axle support assembly of claim 1, wherein the adjustment means further comprises an offset extension arm extending from the second receiver which is pivotally mounted to the first rear axle support arm.

6. The adjustable bicycle rear axle support assembly of claim 5, wherein the first rear axle support arm includes an axle slot, and further wherein the offset extension arm is mounted to the first rear axle support arm proximal to the axle slot thereof.

7. The adjustable bicycle rear axle support assembly of claim 6, wherein the rear axle support member further comprises a second lateral rear axle support arm projecting from the support member plate and adapted to be positioned about a second lateral area of a bicycle rear wheel.

8. The adjustable bicycle rear axle support assembly of claim 7, wherein the adjustment means further comprises a second offset extension arm extending from the second receiver and coupled to the second lateral rear axle support arm.

9. The adjustable bicycle rear axle support assembly of claim 8, wherein the second rear axle support arm includes an axle slot, and further wherein the second offset extension arm is mounted to the second rear axle support arm proximal to the axle slot thereof.

* * * * *